United States Patent [19]
Salatto, Jr. et al.

[11] Patent Number: 5,945,658
[45] Date of Patent: *Aug. 31, 1999

[54] AUTOMATICALLY SELECTABLE RANGE LASER SCANNER

[75] Inventors: Patrick Salatto, Jr., Shirley; Thomas Mazz, Huntington Station, both of N.Y.

[73] Assignee: Symbol Technologies, Inc., Holtsville, N.Y.

[*] Notice: This patent is subject to a terminal disclaimer.

[21] Appl. No.: 08/965,820

[22] Filed: Nov. 7, 1997

Related U.S. Application Data

[60] Continuation of application No. 08/452,995, May 30, 1995, Pat. No. 5,723,851, which is a division of application No. 08/098,243, Jul. 29, 1993, Pat. No. 5,420,411, which is a continuation of application No. 07/717,770, Jun. 14, 1991, abandoned.

[51] Int. Cl.$^6$ ..................................................... G06K 7/10
[52] U.S. Cl. .............................. 235/462.22; 235/462.23; 235/462.45
[58] Field of Search ....................... 235/462.01, 462.06, 235/462.2, 462.22, 462.23, 467.45, 472.01

[56] References Cited

U.S. PATENT DOCUMENTS

| | | | |
|---|---|---|---|
| 4,808,804 | 2/1989 | Krichever et al. | 235/462 |
| 4,843,222 | 6/1989 | Hochgraf | 235/470 |
| 4,877,949 | 10/1989 | Danielson et al. | 235/462 |
| 4,939,355 | 7/1990 | Rando et al. | 235/467 |
| 5,062,115 | 10/1991 | Thornton | 372/50 |
| 5,084,895 | 1/1992 | Shimada et al. | 372/50 |
| 5,420,411 | 5/1995 | Salatto, Jr. et al. | 235/472 |
| 5,446,267 | 8/1995 | Stanzani et al. | 235/440 |
| 5,723,851 | 3/1998 | Salatto, Jr. et al. | 235/462 |

*Primary Examiner*—Donald Hajec
*Assistant Examiner*—Karl D. Frech
*Attorney, Agent, or Firm*—Kirschstein et al.

[57] ABSTRACT

A combined range laser scanner and method for electro-optically reading indicia such as bar codes having parts of different light reflectivity which utilizes two laser diode optical illumination systems optimally focused for different working ranges. A first laser illumination system is optimized for contact operation and has a range extending to approximately two feet. The second laser illumination system is optimized for longer range scanning from approximately two to seventeen feet, and the two laser scanning systems are integrated into one combined range laser scanner. The combined range laser scanner incorporates therein logic circuitry which enables either laser illumination system as required for the particular scanning application. Depending upon which laser illumination system is selected, the laser spot speed (e.g. amplitude of the drive signal for the scanning motor) is controlled to limit the frequency of received light signals to that of standard signal processing and decoding circuits. Scanning is achieved with a common oscillating mirror element driven by a scanning motor, and the amplitude of the applied scanning motor driving signal is greater for the first laser illumination system optimized for contact or short range operation and less for the second laser illumination system for longer range scanning.

27 Claims, 8 Drawing Sheets

AUTOMATICALLY SELECTABLE RANGE LASER SCANNER

CROSS REFERENCE TO RELATED APPLICATION

This application is a continuation of U.S. Ser. No. 08/452,995, filed May 30, 1995, now U.S. Pat. No. 5,723,851, which in turn, is a division of U.S. Ser. No. 08/098,243, filed Jul. 29, 1993, now U.S. Pat. No. 5,420,411, which in turn, is a continuation of U.S. Ser. No. 07/717,770, filed Jun. 14, 1991, now abandoned.

BACKGROUND OF THE INVENTION

1. Field of the Invention

The present invention relates generally to a combined range laser scanner and method for electro-optically reading indicia such as bar codes having parts of different light reflectivity. More particularly, the subject invention pertains to a combined range laser scanner and method as described which utilizes two or more laser diode optical illumination systems focused at different working ranges. One preferred embodiment comprises two laser optical illumination systems, a first system optimized for contact operation, and a second system optimized for longer distance scanning, and the two laser scanning systems are integrated into one combined range laser scanner.

2. Discussion of the Prior Art

The increased use of bar code symbols to identify products, particularly in retail businesses, has resulted in the development of various bar code reading systems. Many users of bar code readers require portable hand-held scanners which place a premium on small size, lightweight and low power consumption requirements for the devices. One such system is a laser scanning bar code reading system as described in U.S. Pat. No. 4,496,831, commonly assigned to the same assignee as the present patent application.

The laser scanning system disclosed in U.S. Pat. No. 4,496,831 includes a portable hand-held scanning head which may be embodied in various shapes but preferably has a gun shaped housing made of lightweight plastic. A handle and barrel portion are provided to house the various components of the scanning system therein. Within the barrel portion are mounted a miniature light source, a miniature optic train including focusing lenses and a scanning system for directing light from the light source across a bar code symbol, and miniature sensing means for detecting reflected light from the bar code symbol being scanned.

The miniature light source can comprise a laser tube such as a coaxial helium neon laser tube, or an LED, or preferably a semiconductor laser diode which is considerably smaller and lighter than a laser tube, thus reducing the required size and weight of the scanning head and making the scanning head easier to handle and more maneuverable. Light generated by the light source passes through the optic train which directs the beam onto the scanning system which is mounted within the barrel portion of the scanning head. The scanning system sweeps the laser beam across-the bar code symbol and comprises at least one scanning stepping motor or resonating or vibrating bar or scanner for sweeping the beam lengthwise across the symbol, and may comprise two motors wherein the second motor sweeps the beam widthwise across the symbol. Light reflecting mirrors are mounted on the motor shaft or shafts to direct the beam through the outlet port to the symbol.

A sensing circuit then detects and processes the light reflected from the symbol and generally comprises a photodetector element such as a semiconductor photodiode. The user positions the hand-held unit so the scan pattern traverses the symbol to be read, and the photodetector element produces serial electrical signals to be processed for identifying the bar code. A signal processing circuit for a bar code produces a signal which is directed to a bar pattern decoder circuit for decoding the bar pattern.

The reader unit can have a movable trigger employed to allow the user to activate the light beam and detector circuitry when pointed at the symbol to be read, thereby conserving battery life if the unit is self-powered. The lightweight plastic housing contains the laser light source, the detector, the optics, signal processing circuitry, a CPU and a battery. The reader is designed to be aimed at a bar code symbol by the user from a position where the reader is spaced from the symbol, i.e., not touching the symbol or moving across the symbol. Typically, this type of hand-held bar code reader is specified to operate in the range of perhaps several inches. Alternatively, the scanning can be performed automatically without any human interface or intervention.

Current prior art laser scanners for electro-optically reading bar codes limit operating ranges from a) contact to approximately two feet for most common density bar code symbols, and b) longer ranges from approximately thirty inches to eighteen feet for low density bar code symbols. Such prior art laser scanners utilize a single laser optical illumination system having a single fixed focal length, and consequently have a limited depth of focus and working range.

SUMMARY OF THE INVENTION

Accordingly, it is a primary object of the present invention to provide a combined range laser scanner and method for electro-optically reading indicia such as bar codes having parts of different light reflectivity which utilizes two or more laser diode optical illumination systems optimally focused for different working ranges. One disclosed preferred embodiment comprises two laser optical illumination systems, a first laser illumination system optimized for contact operation and having a range extending to approximately two feet, and a second laser illumination system optimized for longer range scanning from approximately two to seventeen feet, and the two laser scanning systems are integrated into one combined range laser scanner.

A further object of the subject invention is the provision of a combined range laser scanner as described which incorporates therein logic circuitry which enables either laser illumination system as required for the particular scanning application. Depending upon which laser illumination system is selected, the laser spot speed (e.g. amplitude of the drive signal for the scanning motor) is controlled to limit the frequency of received light signals to that of standard signal processing and decoding circuits. Scanning is achieved with a common oscillating mirror element driven by a scanning motor, and accordingly the amplitude of the applied scanning motor driving signal should be greater for the first laser illumination system optimized for contact or short range operation and less for the second laser illumination system for longer range scanning.

In accordance with the teachings herein, the present invention provides a combined range laser scanner and method for electro-optically reading indicia such as a bar code symbol having parts of different light reflectivity. The laser scanning system includes a single common scanning mirror for causing a laser beam to be scanned over a field of view, and short and long range laser illumination optical systems for respectively short or long range scanning operations. A collection optical system is provided for collecting light reflected from the scanned field of view and directing it onto an optical detector which detects the reflected laser radiation and generates electrical signals corresponding to the reflected light.

In further detail, a selection means is provided for selectively activating either the short or long range laser illumination system for operation at respectively short or long ranges in the field of view. In one disclosed embodiment, the selection means includes a signal processing circuit for analyzing the amplitude and frequency of a reflected signal when the longer range scanning system is temporarily actuated in a range finding operation. A bar code located at a farther distance will result in a detector output signal of lower amplitude with higher frequency components, and conversely a detector output signal with a higher amplitude and lower frequency components at shorter ranges. Accordingly, based upon the amplitude and frequency components of the detected signal during a range finding operation, either the short or longer range illumination system is selected. In a second embodiment, a sonar range finder can be used for detecting the range to a target in the field of view. In a third disclosed embodiment, the selection means comprises a manually operated selection means selectively actuated by an operator, such as a trigger which includes first and second trigger detent positions which are selectively actuated by the operator.

In one disclosed embodiment, the scanning mirror includes a flat scanning mirror which is driven by a scanning motor. The short range laser illumination optical system comprises a short range visible laser diode assembly positioned directly in front of the scanning mirror. The longer range laser illumination optical system includes a fold mirror positioned adjacent the short range visible laser diode, and a long range visible laser diode assembly positioned to direct laser radiation to the fold mirror for reflection onto the scanning mirror.

In one preferred embodiment, the short range laser illumination system and longer range laser illumination system could comprise a single integrated laser diode assembly designed to operate in either a short or longer range mode of operation positioned directly in front of the scanning mirror.

The short range laser illumination optical system preferably has a range from contact up to approximately two feet from the laser scanner, whereas the longer range laser illumination system has a range of approximately two feet to seventeen feet from the laser scanner assembly. The collection optical system includes a single common collection mirror which focuses all scanned laser radiation reflected from the field of view onto an optical detector such as a photodiode.

BRIEF DESCRIPTION OF THE DRAWINGS

The foregoing objects and advantages of the present invention for a combined range laser scanner may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
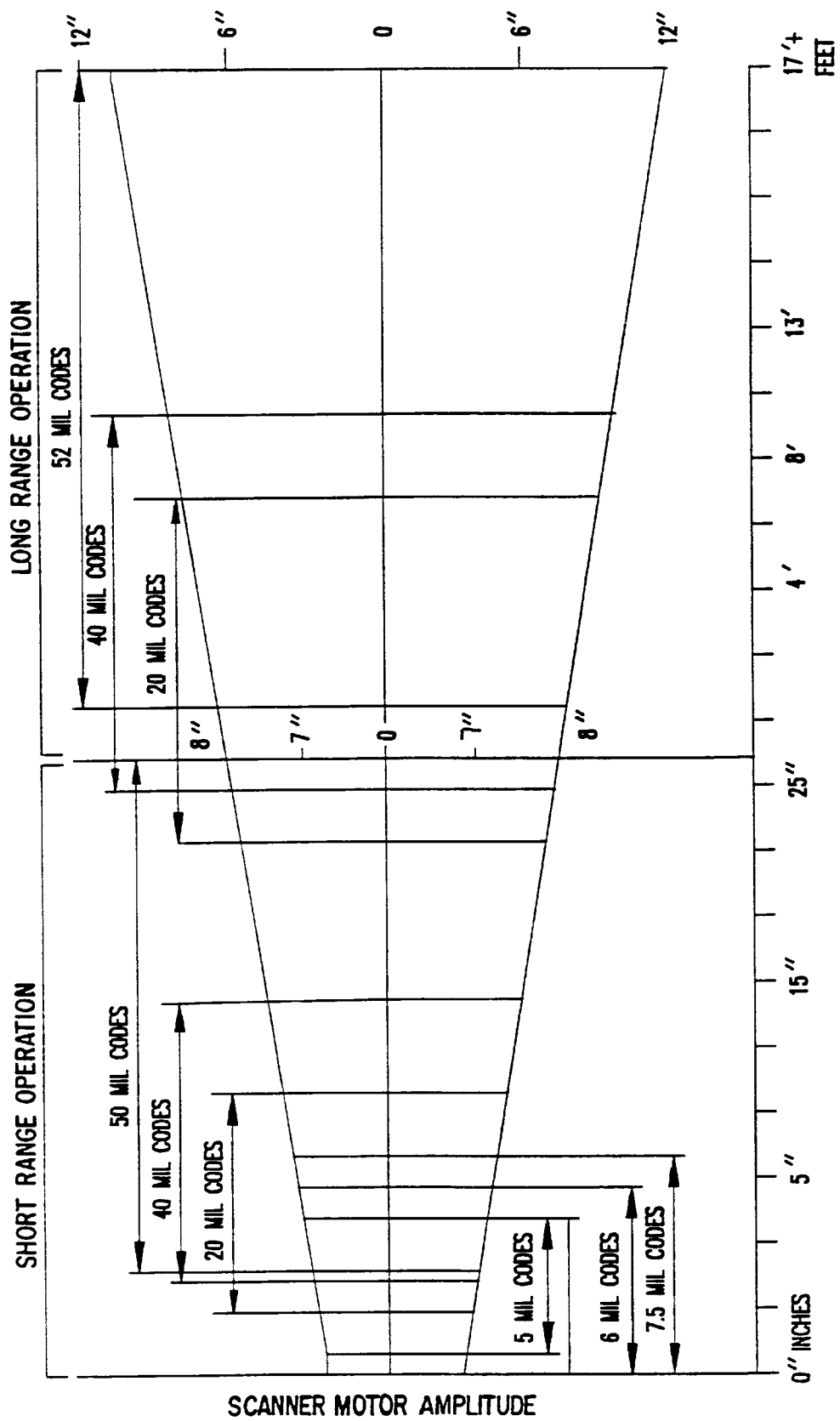
FIG. 1 illustrates scanning decoding zone ranges for different bar code resolutions for a combined dual short and long range scanner pursuant to the teachings of the present invention.

Referring to the drawings in detail, FIG. 1 illustrates scanning decoding zone ranges for different bar code resolutions for high quality bar code symbols at 20° C. for a combined dual short and long range scanner pursuant to the teachings of the present invention. A short range decoding zone provides for reading bar code patterns from contact to approximately two feet, while a long range decoding zone provides for reading bar code patterns from approximately two to seventeen feet. As indicated by FIG. 1, the resolution attainable for bar code patterns ranges from a 0.005 inch bar width for bar code patterns at a very close range to a 0.050 inch bar width for bar code patterns at a distant range. An overlapping range exists in the region between the short and long range decoding zones, and in fact the short range decoding zone extends out to approximately four and one half feet, while the long range decoding zone extends from approximately ten inches to approximately twenty feet, but decoding operations performed outside the more restricted ranges mentioned hereinabove are not optimized.

Figure 2:
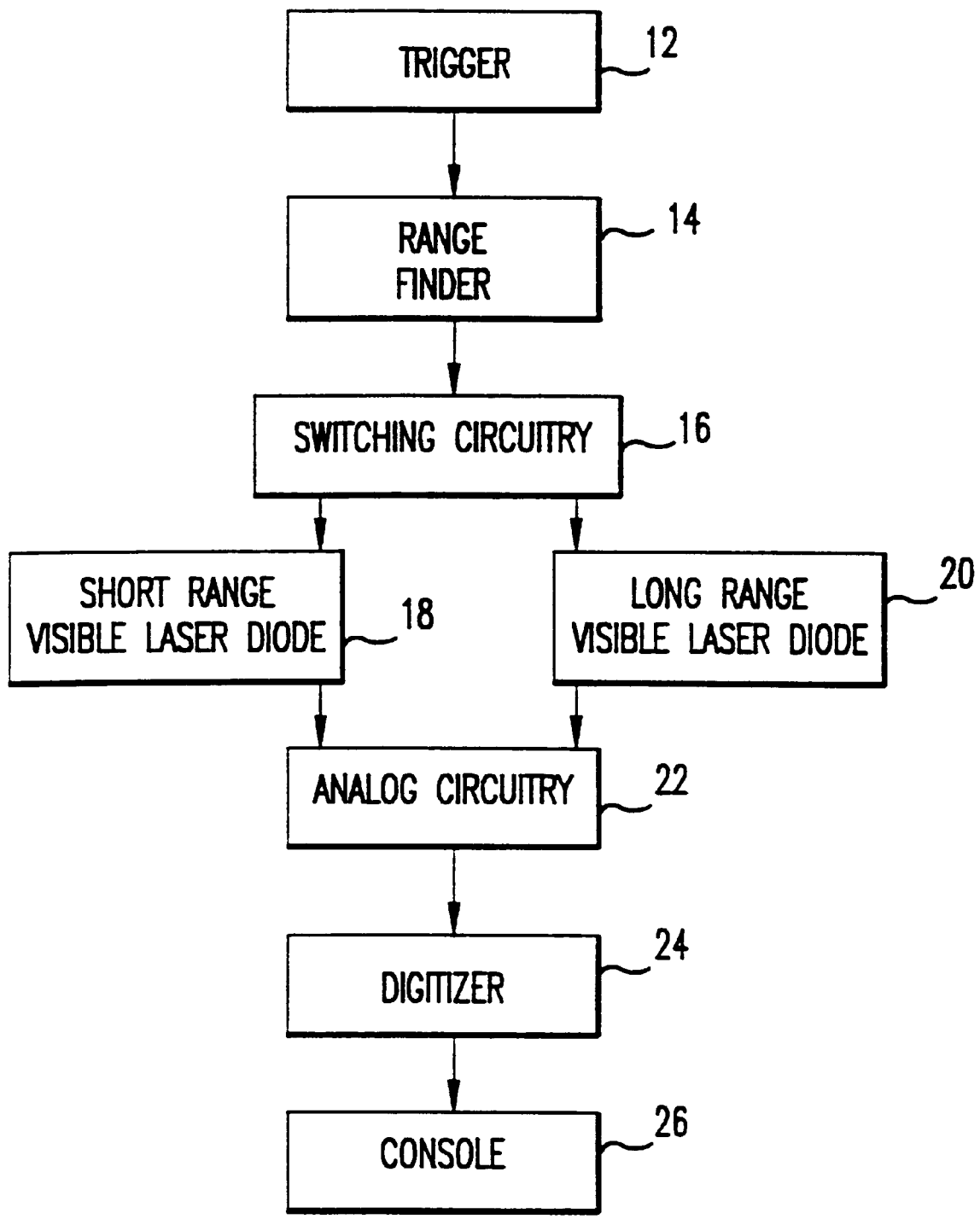
FIG. 2 is a block diagram of the major functions and components of a first embodiment of a combined dual short and long range scanner pursuant to the present invention.

FIG. 2 is a block diagram of the major functions and components of a first embodiment of a combined dual short and long range scanner pursuant to the present invention. The combined dual range scanner (combination short and longer range) scans, analyzes and transmits bar code data in a fraction of a second. When the combined scanner is aimed at a bar code symbol and a trigger 12 is pulled, the following sequence of operations occurs:

In a scan module, a range finder 14 detects the distance to the bar code symbol. In one preferred embodiment, the range finder 14 can comprise a signal processing circuit for analyzing the amplitude and frequency of a reflected signal when the longer range scanning system is temporarily actuated in a range finding operation. A bar code located at a farther distance will result in a detector output signal of lower amplitude with higher frequency components, and conversely a detector output signal with a higher amplitude and lower frequency components at shorter ranges. Accordingly, based upon the amplitude and frequency components of the detected signal during a range finding operation, either the short or longer range illumination system is selected. In a second embodiment, the range finder can comprise a Polaroid sonar type of range finder as used in commercial cameras. Based upon the output of the range finder, switching circuitry 16 selects which visible laser diode circuit is to be used, either a short range visible laser diode 18 or a longer range visible laser diode 20.

Figure 4:
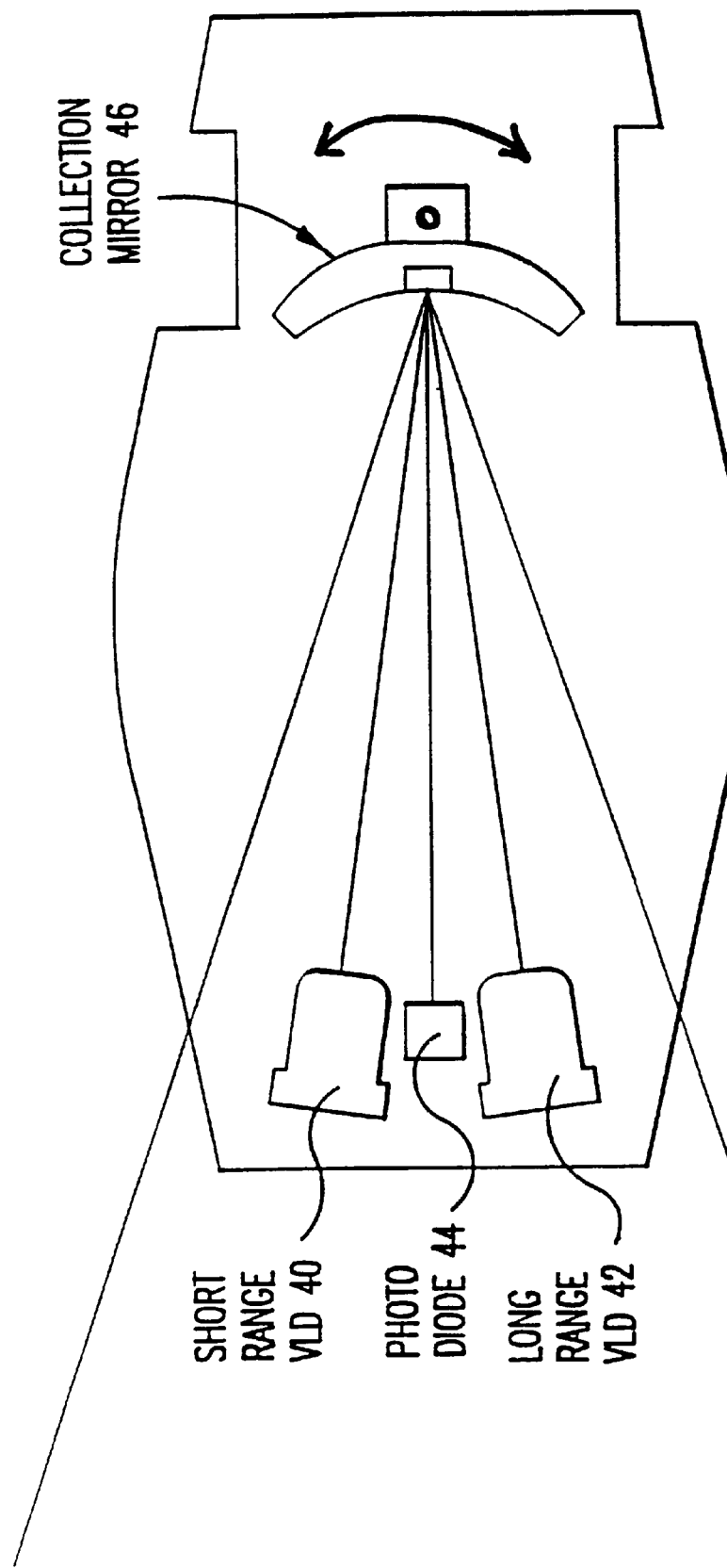
FIG. 4 illustrates a schematic view of an exemplary arrangement of an optical system for a combined dual short and long range scanner of the subject invention.
Figure 5:
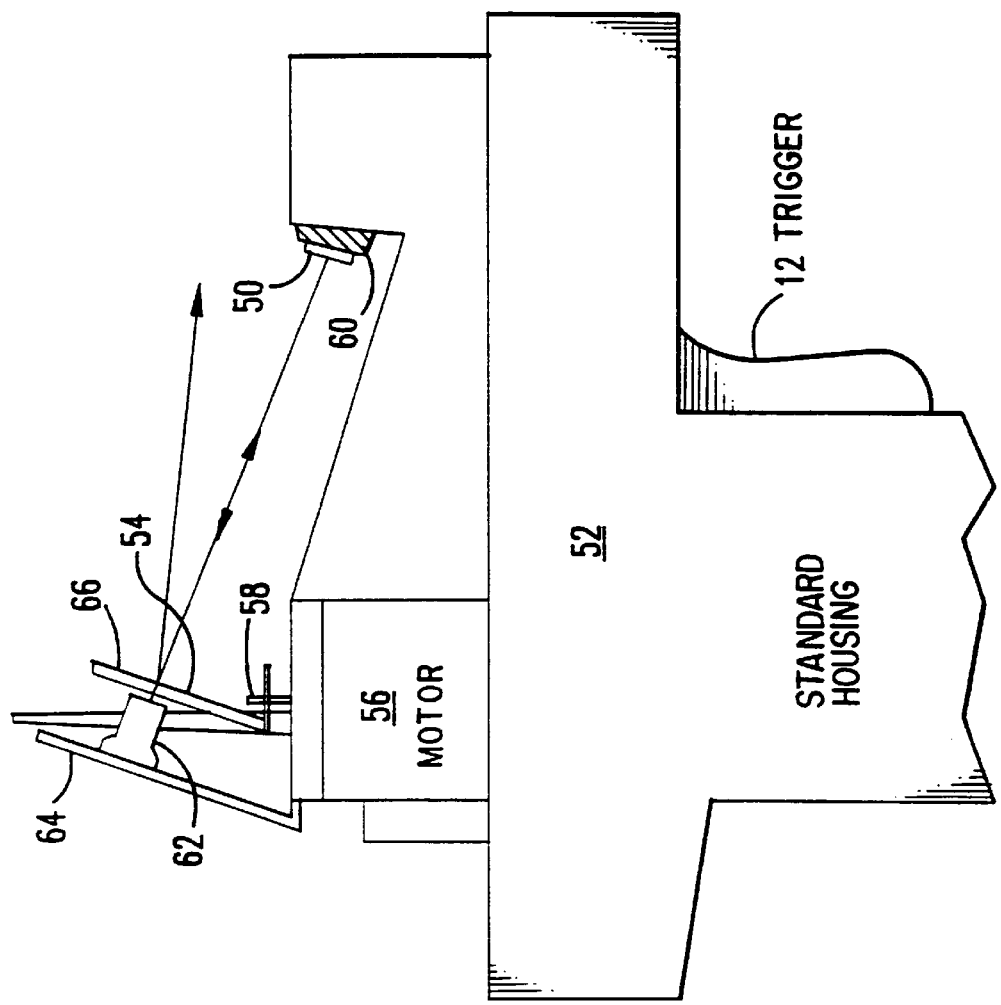
FIG. 5 illustrates a side elevational view of an exemplary optical system for a combined dual short and long range scanner pursuant to the subject invention.
Figure 6:
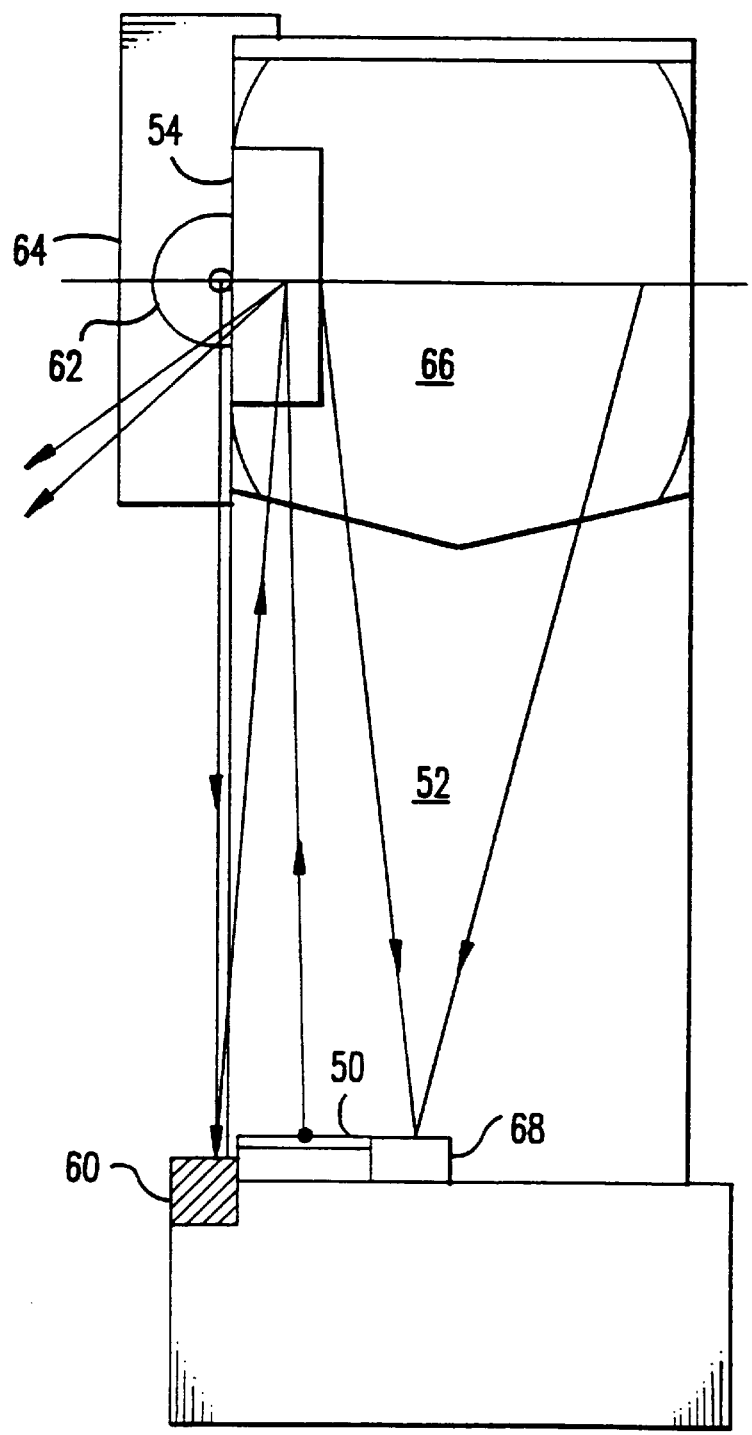
FIG. 6 is a front elevational view of the exemplary optical system of FIG. 5.

In one preferred embodiment, the short range laser illumination system and longer range laser illumination system could comprise a single integrated laser diode assembly designed to operate in either a short or longer range mode of operation positioned directly in front of the scanning mirror. In an alternative preferred embodiment, the short and longer range illumination systems comprise separate short range and longer range laser diode assemblies as illustrated in FIGS. 4, 5 and 6.

The selected solid state laser diode generates a laser beam, and focusing optics in the laser diode assembly transmits the laser beam to a flat scanning mirror that is oscillated to cause the laser beam to be swept across the scanned bar code pattern. Scanning is achieved with a common oscillating flat mirror element driven by a scanning motor, and because of the short distance to a short range bar code target, the amplitude of the applied scanning motor driving signal should be greater for the first laser illumination system optimized for contact or short range operation, and conversely because of the longer distance to a long range bar code target, it should be less for the second laser illumination system for longer range scanning. The different scanning speeds limit the frequency of received light signals to that of standard signal processing and decoder circuits. The oscillating scanner mirror reflects the laser light beam through an exit window to the bar code symbol. Typically, the laser beam is scanned back and forth across the bar code symbol at approximately 36 times a second. An optical detector senses the laser light reflected back from the bar code symbol, and converts the light signals into an analog signal which is processed by analog circuitry 22 in a manner as known in the art and disclosed by prior art patents cited herein. The pattern of the analog signal represents the information in the bar code symbol.

Signal conditioning circuits in a digitizer circuit 24 convert the analog signal into a digitized bar pattern signal, also in a manner as known in the art, and this pattern is transmitted to an interface controller module in a console 26 for decoding.

Figure 3:
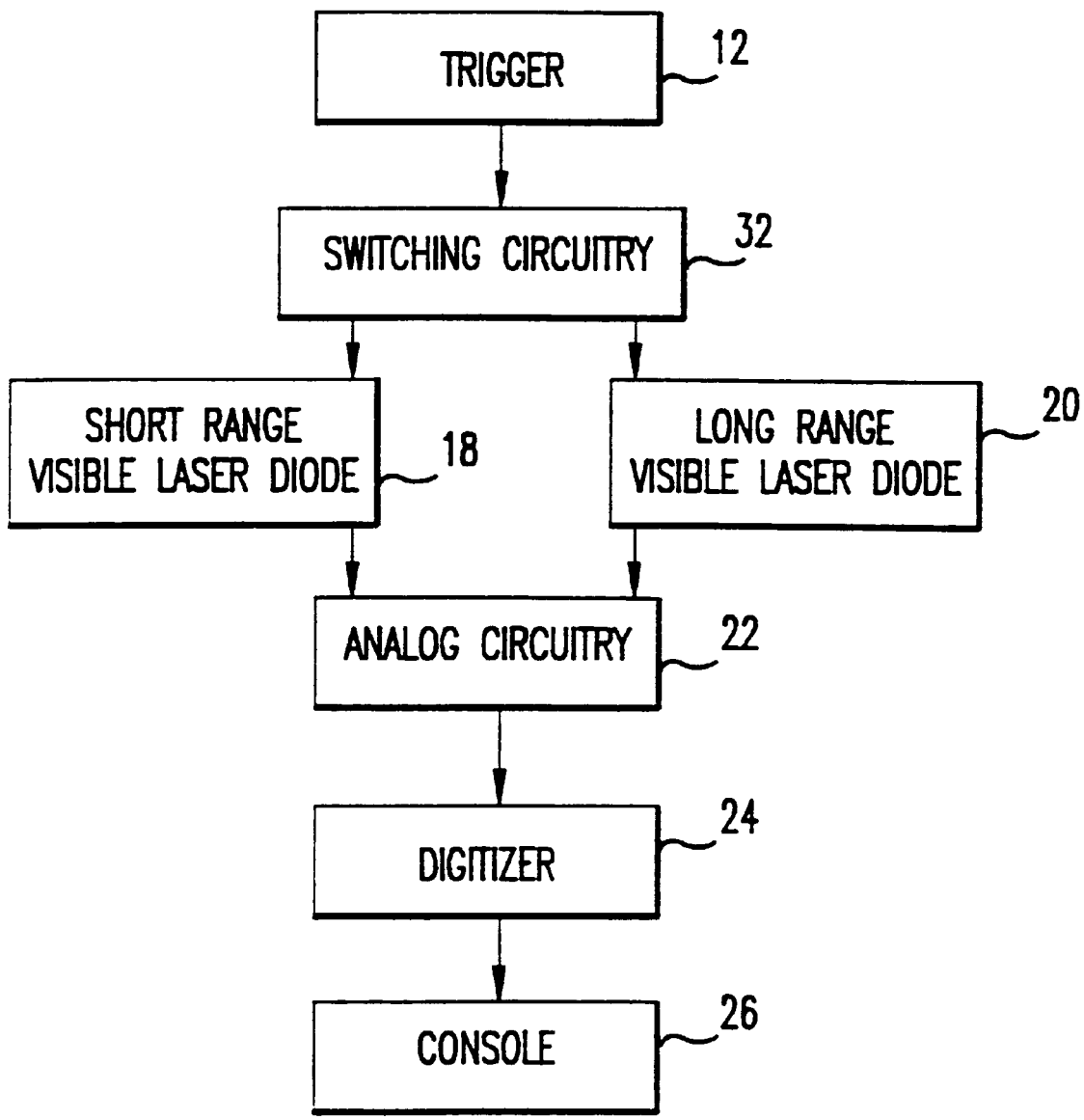
FIG. 3 is a block diagram of the major functions and components of a second embodiment of a combined dual short and long range scanner pursuant to the present invention.

FIG. 3 is a block diagram of the major functions and components of a second embodiment of a combined dual short and long range scanner assembly pursuant to the present invention. In this embodiment, either the short or long range laser diode is selectively activated by an operator actuating a trigger 12 having first and second detent trigger positions as follows. In operation, for long range operation, the trigger is initially activated to a first detent position. Logic switching circuitry 32 in the combined dual range scanner selects the long range laser diode and selects an appropriate aim scan amplitude for the scanner motor for operation in an aiming mode. In an aiming mode, as is known in the art, a flat scanning mirror is first activated to oscillate slowly, producing a horizontal scan line of the visible laser beam which is used by the operator to aim the scanner at distances up to 18 feet.

The trigger is then activated to a second detent position. The logic circuitry 16 selects the long range laser beam and long range scan amplitude based upon the long dwell time at the first trigger detent position. After the trigger is depressed to the second detent position, the flat scanning mirror is then oscillated at its normal long range scan frequency and width, and a detection circuit is enabled. The light reflected back into a curved collection mirror is focused onto a photodetector and amplified to a signal that is then digitized into a digital signal which is processed by a decoder. Scanning is achieved with a common oscillating flat mirror element driven by a scanning motor,. and accordingly the amplitude of the applied scanning motor driving signal should be greater for the first laser illumination system optimized for contact or short range operation and less for the second laser illumination system for longer range scanning. The different scanning speeds limit the frequency of received light signals to that of standard signal processing and decoding circuits. Operation then continues in a manner as explained hereinabove with respect to the first embodiment.

For short range operation, an operator aims the scanner at a short range bar code (from contact to 24"). The trigger is then actuated by pulling it directly to the second detent position of the trigger switch. The logic circuitry 32 selects the short range laser 20 and short range scan amplitude based upon the minimal dwell time at the first trigger detent position. The scanning mirror is first actuated in an aiming mode in which the scanning motor oscillates slowly to produce a visible horizontal scan line which is used by the operator to aim the scanner. The scanning mirror is then oscillated at its normal short range scan frequency and width, and the detection circuit is enabled. The light reflected back into the collection mirror is focused onto the photodetector and amplified to a signal that is then digitized into a digital signal which is processed by a bar code decoder circuit.

FIG. 4 illustrates a schematic view of an exemplary arrangement of an optical system for a combined dual short and long range scanner assembly of the subject invention. A short range visible laser diode assembly 40 and long range visible diode assembly 42 are shown schematically positioned on opposite sides of a photodiode detector 44 which detects laser radiation directed thereto by a collection mirror 46. In alternative embodiments, the positioning of the elements 40, 42 and 44 may be varied in different geometric arrangements.

FIGS. 5 and 6 illustrate respectively a side elevational view and a front elevational view of an exemplary optical system for a combined dual short and long range scanner assembly pursuant to the subject invention. Referring thereto, a short range visible laser diode assembly 50 is positioned near the front of a reader gun 52 directly in front of a flat scanning mirror 54 which is oscillated by a scanning motor 56 and drive mechanism 58. A long range flat fold mirror 60 is positioned adjacent to the laser diode assembly 50, and is illuminated by a long range visible laser diode assembly 62 mounted on a heat sink 64 positioned adjacent the flat scanning mirror 54 in the rear of the gun housing. Laser radiation from laser diode 62 is directed to the fold mirror 60 which reflects it onto the oscillating scanning mirror 54, which directs it through the exit aperture of the gun.

Laser radiation reflected by the bar code pattern is received and collected by a curved collection mirror 66, which reflects and focuses it to a photodiode detector 68. The flat scanning mirror 54 and curved collected mirror 66. are preferably formed as one integral mirror element as shown in FIG. 6 which is driven by the scanning motor 56 in a manner as is known in the art.

Figures 7A, 7B:
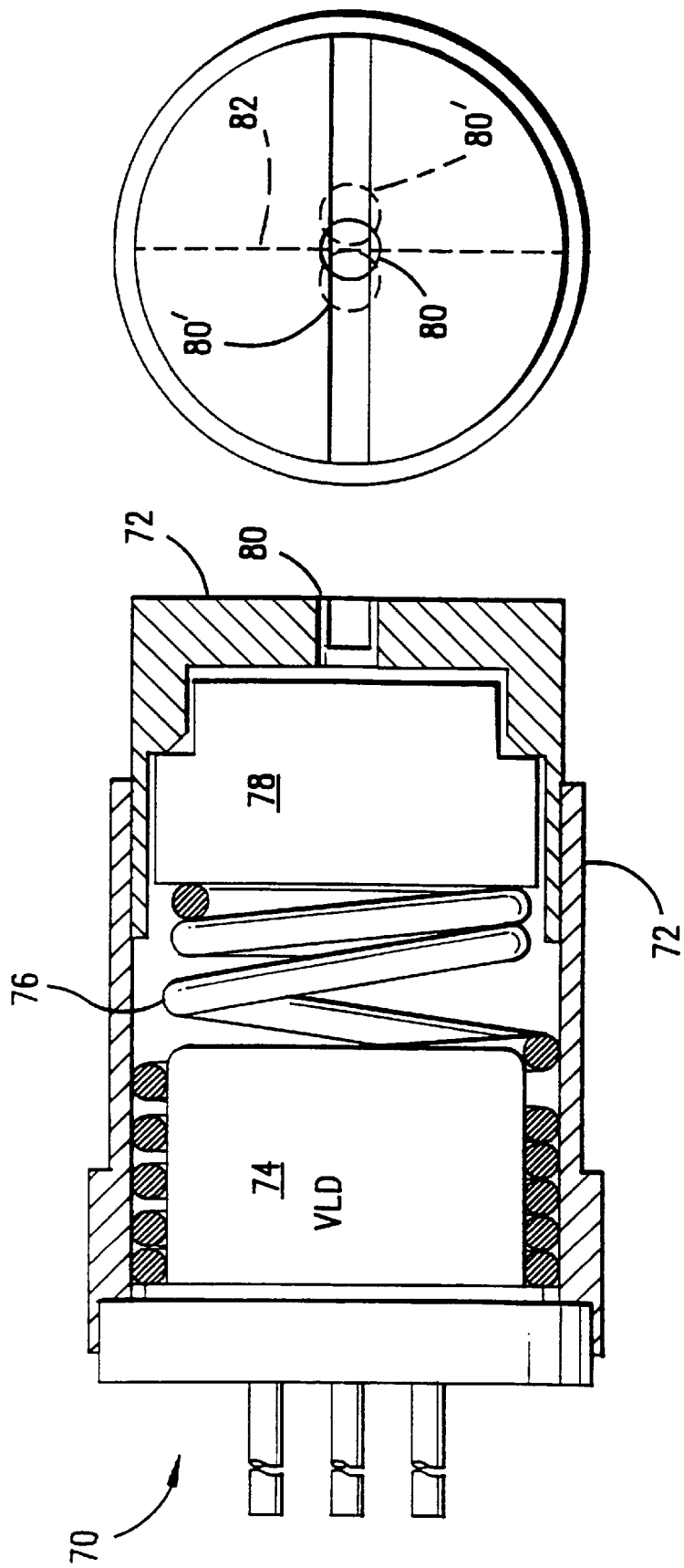
FIG. 7A and 7B illustrate a sectional and front view of a laser diode assembly illustrating the construction and major components thereof.

FIG. 7A illustrates a sectional view of a typical laser diode assembly illustrating the construction and major components thereof. Referring thereto, a typical laser diode assembly 70 comprises an assembly housing 72 having a visible laser diode package 74 at one end, and a lens spring 76 biased against a focusing lens 78 at the opposite end of the housing. A central aperture 80 in the opposite end of the housing allows a laser beam focused at an appropriate distance by the lens 78 to exit as the laser beam. In the short range laser diode assembly, the lens 78 focuses the laser beam for short range scanning operations, whereas in the longer range laser diode assembly, the lens 78 focuses the laser beam for longer range scanning operation.

In one preferred embodiment shown in FIG. 7B, the short range laser illumination system and longer range laser illumination system could comprise a single integrated laser diode assembly designed to operate in either a short or longer range mode of operation positioned directly in front of the scanning mirror such as at the position of the short range laser diode assembly 60 in FIGS. 5 and 6. In this embodiment, two laser apertures 80' and 80' are positioned adjacent to each other on opposite sides of the center of the assembly as shown in phantom in FIG. 7B, the lens is formed as one integral lens having two different focusing surfaces divided down the center as indicated by phantom line 82 in FIG. 7, such that a different curvature lens surface, one for near focusing and one for far focusing, is positioned in front of each of the two different exit apertures 80',80'. The laser diode package 74 would house two different laser diodes, one positioned directly behind each laser aperture 80', 80'. It should be realized that the laser diode element itself is extremely small, such that the side-by-side positioning of two such laser diodes in the laser diode package 74 is easily accommodated.

Figure 8:
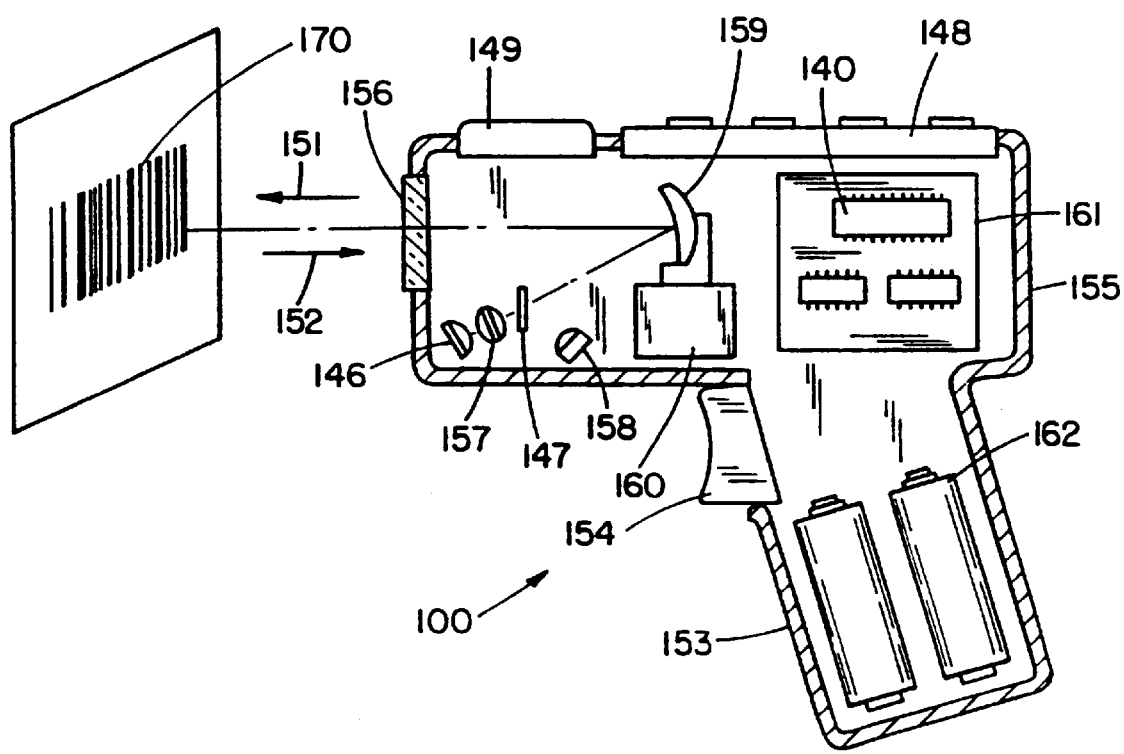
FIG. 8 illustrates a highly simplified embodiment of one type of bar code reader which can be utilized in association with the combined range laser scanner of the present invention.

FIG. 8 illustrates a highly simplified embodiment of one type of bar code reader that may be utilized in association with the combined range laser scanner assembly of the present invention. A reader 100 may be implemented in a hand-held scanner, as illustrated, or a desk-top workstation or stationery scanner. In a preferred embodiment, the arrangement is implemented in a housing 155 that includes an exit port 156 through which an outgoing laser light beam 151 is directed to impinge on, and to be scanned across, symbols 170 located exteriorly of the housing.

The hand-held device of FIG. 8 is generally of the style disclosed in U.S. Pat. No. 4,760,248 issued to Swartz, et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz, et al. or U.S. Pat. No. 4,409,470 issued to Shepard, et al., both such patents assigned to Symbol Technologies, Inc., may be employed in constructing the bar code reader unit of FIG. 8. These U.S. Pat. Nos. 4,760,248, 4,896,026 and 4,409,470 are incorporated herein by reference, but the general design of such devices will be briefly described here for reference.

Referring to FIG. 8 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a scan pattern, and the user positions the hand-held unit so this scan pattern traverses the symbol to be read. Reflected light 152 from the symbol is detected by a light-responsive device 158 in the reader unit, producing serial electrical signals to be processed and decoded for reproducing the data represented by the bar code.

In a preferred embodiment, the reader unit 100 is a gun shaped device having a pistol-grip type of handle 153, and movable trigger 154 is employed to allow the user to activate the light beam 151 and detector circuitry when pointed at the symbol to be read, thereby saving battery life if the unit is self-powered. A lightweight plastic housing 155 contains the laser light source, the detector 158, the optics and signal processing circuitry, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches.

The reader 100 may also function as a portable computer terminal, and include a keyboard 148 and a display 149, such as described in the previously noted U.S. Pat. No. 4,409,470.

As further depicted in FIG. 8, a suitable lens 157 (or multiple lens system) may be used to focus the scanned beam onto the bar code symbol at an appropriate reference plane. A light source 146 such as a semiconductor laser diode is positioned to introduce a light beam into the axis of the lens 157, and the beam passes through a partially silvered mirror 147 and other lenses or beam-shaping structure as needed, along with an oscillating mirror 159, which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol before pulling the trigger 154.

While several embodiments and variations of the present invention for a combined range laser scanner are described in detail herein, it should be apparent that the disclosure and teachings of the present invention will suggest many alternative designs to those skilled in the art.

What is claimed is:

1. A combined range laser scanner assembly for electro-optically reading indicia having parts of different light reflectivity on targets, comprising:
   a) a short range laser illumination optical system for illuminating and scanning, when activated, an indicium on a short range target located within a short range of distances from the assembly;
   b) a long range laser illumination optical system for illuminating and scanning, when activated, an indicium on a long range target located within a long range of distances, longer than said short range, from the assembly; and
   c) automatically operable selection means for selectively automatically activating the short range laser illumination optical system for operation at said short range, and for selectively automatically activating the long range laser illumination optical system for operation at said long range.

2. The assembly as defined in claim 1, wherein the selection means includes a range finder for detecting a distance of a target from the assembly.

3. The assembly as defined in claim 2, wherein the range finder directs sonar signals at the target, and detects echoes from the target.

4. The assembly as defined in claim 2, wherein the range finder includes a signal processor for analyzing amplitude and frequency components of electrical signals generated by an optical detector for detecting light reflected off the target.

5. Apparatus for detecting indicia having portions of different light reflectivity, comprising:
   a) a plurality of selectable, activatable light sources for emitting a plurality of light beams at working ranges, each light beam being focused such that each light source has a different working range at different distances from the light sources;
   b) an optical scanning component for directing a selected light beam along an optical path toward a target located in the vicinity of a reference plane lying generally normal to the optical path so as to scan spatially adjacent portions of said reference plane; and
   c) a sensor having a field of view and operative for detecting at least a portion of light of variable intensity reflected off the target, and for generating an electrical signal indicative of the detected light intensity.

6. The apparatus as defined in claim 5, wherein said working ranges are non-overlapping.

7. The apparatus as defined in claim 5, wherein said light sources are lasers.

8. The apparatus as defined in claim 5, further comprising an automatic selector for selectively automatically activating one of said plurality of light sources for operation in a predetermined one of the working ranges.

9. The apparatus as defined in claim 8, wherein the selector includes a range finder for detecting a distance of the target from the apparatus.

10. The apparatus as defined in claim 9, wherein the range finder directs sonar signals at the target, and detects echoes from the target.

11. The apparatus as defined in claim 9, wherein the range finder includes a signal processor for analyzing amplitude and frequency components of the electrical signal generated by the sensor.

12. A system for reading bar code symbols on targets, comprising:
   a) a scanner for illuminating a target with light;
   b) an automatically-operable actuator, operative in a first selectable mode, for producing a first scanning beam that enables the system to read a bar code symbol within a first working range from the scanner, and in a second selectable mode, for producing a second scanning beam that enables the system to read a bar code symbol within a second working range, different from said first working range, from the scanner; and
   c) a detector for receiving reflected light from said symbol to produce an electrical signal corresponding to data represented by said symbol.

13. The system according to claim 12, wherein said scanner includes first and second distinct light sources, each operative for emitting a light beam and focused such that each light source has a different working range at different distances from the light sources.

14. A combined range laser scanner assembly for electro-optically reading indicia having parts of different light reflectivity on a target located at a variable distance from the assembly, comprising:
   a) a first range laser illumination optical system including a first visible laser diode for first range scanning operations;
   b) a scanning mirror for directing a laser beam generated by said first visible laser diode towards the indicia to be scanned over a field of view;
   c) a second range, different from the first range, laser illumination optical system including a second visible laser diode for second range scanning operations;
   d) a folding mirror positioned to direct a laser beam generated by said second visible laser diode to said scanning mirror;
   e) a collection optical system for collecting light reflected from the scanned field of view; and
   f) an optical detector for detecting light directed thereto by the collection optical system, and for generating electrical signals corresponding to the reflected light.

15. A system for reading bar code symbols, comprising:
   a) a scanner for generating a laser beam directed toward a symbol on a target, including first and second optical sources for operation in first and second working ranges respectively;
   b) a detector for receiving reflected light from the symbol to produce electrical signals corresponding to data represented by the symbol; and
   c) a selector including an automatically operated switch to select one of said first and second working ranges of operation.

16. A method of reading indicia on targets, comprising the steps of:
   a) scanning an indicium on a target over a field of view with light reflected from a scanning mirror;
   b) illuminating the scanning mirror for short range scanning operations by a short range laser illumination optical system;
   c) illuminating the scanning mirror for long range, longer than the short range, scanning operations by a long range laser illumination optical system;
   d) collecting scanned light reflected from the scanned field of view with a collection optical system; and
   e) selectively automatically activating the short range laser illumination optical system for operation at short ranges in the field of view, and selectively activating the long range laser illumination optical system for operation at long ranges in the field of view.

17. The method as defined in claim 16, wherein the activating step is performed by detecting a distance of the target from the scanning mirror.

18. The method as defined in claim 16, wherein the activating step is performed by directing sonar signals at the target, and detecting echoes from the target.

19. The method as defined in claim 16, wherein the activating step is performed by analyzing the collected scanned light.

20. A method of reading indicia of different light reflectivity, comprising the steps of:
   a) directing light toward an indicium on a target;
   b) selectively automatically producing either a first scanning beam to scan the indicium within a first working range, or a second scanning beam to scan the indicium within a second working range, which is different from said first working range; and
   c) receiving light reflected from the indicium to produce electrical signals corresponding to data represented by the indicium.

21. The method as defined in claim 20, further comprising the step of repetitively and reciprocatingly sweeping the selected scanning beam across the indicium along arcs of limited angular distance in a first operational state, and along arcs of predetermined angular distance greater than said limited angular distance in a second operational state, said first and second states corresponding to said first and second working ranges.

22. The method as defined in claim 20, wherein the producing step is performed by detecting a distance of the target from an electro-optical reader.

23. The method as defined in claim 22, wherein the detecting step is performed by directing sonar signals at the target, and detecting echoes from the target.

24. The method as defined in claim 22, wherein the detecting step is performed by analyzing amplitude and frequency components of the electrical signals.

25. A method of detecting indicia having portions of different light reflectivity on targets, comprising the steps of:

a) automatically selecting one from a plurality of light sources for emitting a plurality of light beams at working ranges, each light beam being focused such that each light source has a different working range at different distances from the light sources;

b) directing a selected light beam from said one of said light sources along an optical path toward a target located in the vicinity of a reference plane lying generally normal to the optical path so as to scan spatially adjacent portions of said reference plane; and c) detecting at least a portion of light of variable intensity reflected off the target, and generating an electrical signal indicative of the detected light intensity.

26. The method as defined in claim 25, wherein said working ranges are non-overlapping.

27. The method as defined in claim 25, wherein said light sources are lasers.

* * * * *